G. E. LYDICK.
LIQUID FUEL BURNER.
APPLICATION FILED FEB. 21, 1917.

1,256,914.

Patented Feb. 19, 1918.
2 SHEETS—SHEET 1.

WITNESSES
Guy M. Spring
J. S. Schrott

INVENTOR
George E. Lydick
BY Richard Owen
ATTORNEY

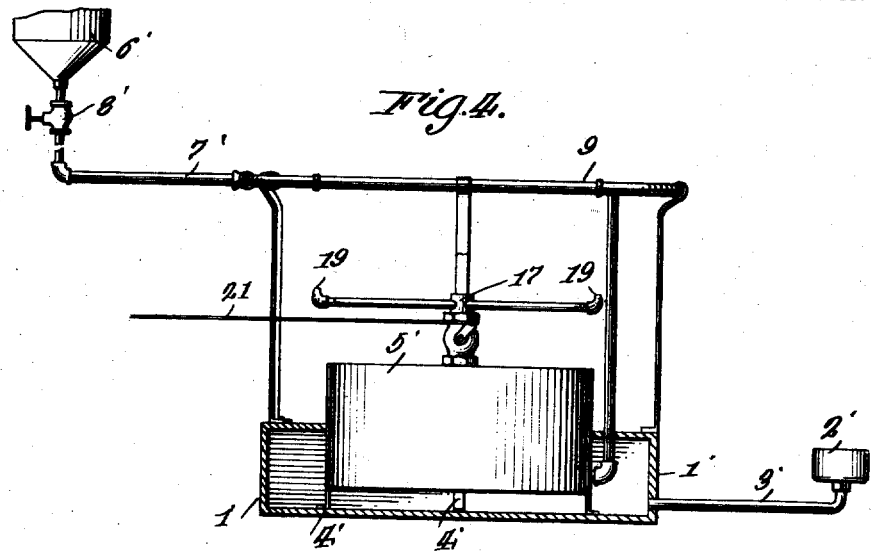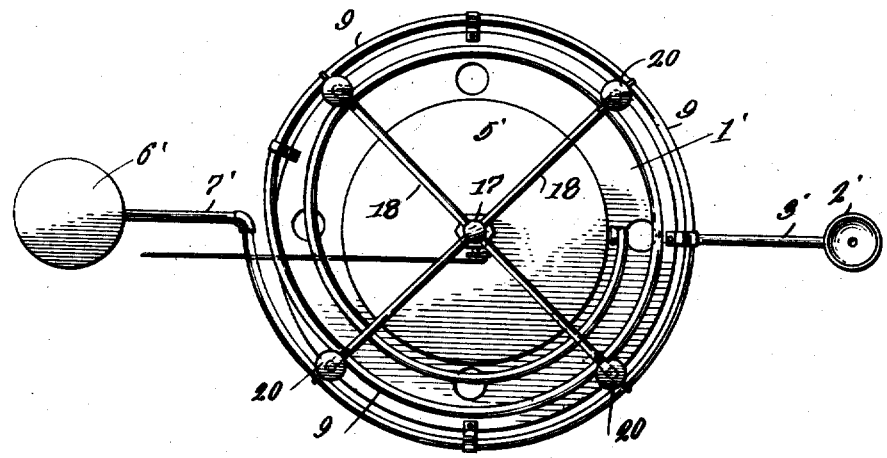

UNITED STATES PATENT OFFICE.

GEORGE E. LYDICK, OF PUEBLO, COLORADO.

LIQUID-FUEL BURNER.

1,256,914. Specification of Letters Patent. Patented Feb. 19, 1918.

Application filed February 21, 1917. Serial No. 150,112.

*To all whom it may concern:*

Be it known that I, GEORGE E. LYDICK, a citizen of the United States, residing at Pueblo, in the county of Pueblo and State of Colorado, have invented certain new and useful Improvements in Liquid-Fuel Burners, of which the following is a specification.

My invention relates to improvements in liquid fuel burners, and it consists in the constructions, combinations, and arrangements herein described and claimed.

An object of my invention is to provide a liquid fuel burner adapted to any ordinary cooking stove, to boilers of various types, etc., including a generating pan wherein the liquid fuel is vaporized so that it may be burned without permitting fumes or smoke.

Other objects and advantages will appear from the following specification, reference being had to the accompanying drawings, forming a part thereof, in which:

Fig. 4 is a side elevation showing a slightly modified form of the burner, the generating pan being shown in sections, and Fig. 5 is a top plan view of the structure shown in Fig. 4.

Figure 1:
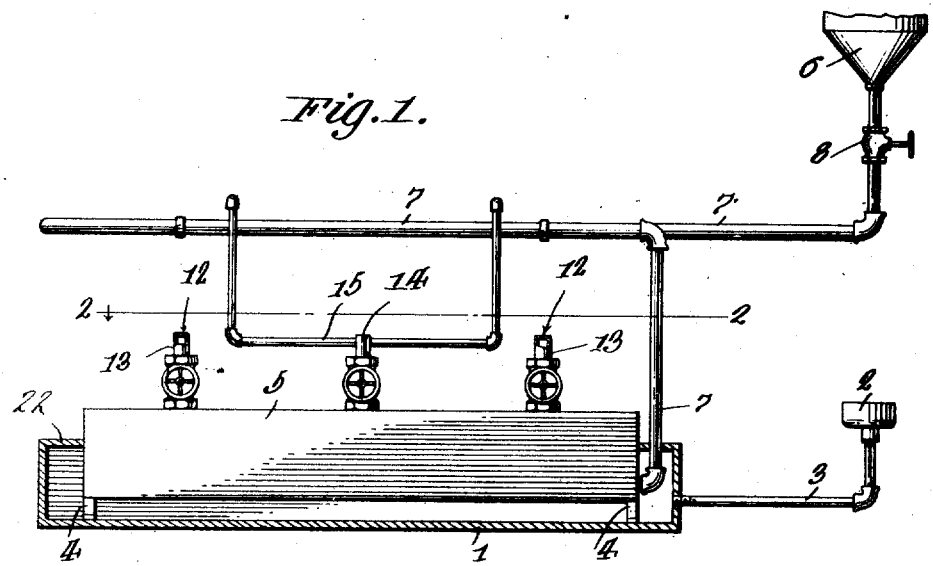
Figure 1 is a side elevation of the burner, the generating pan being shown in sections.
Figure 2:
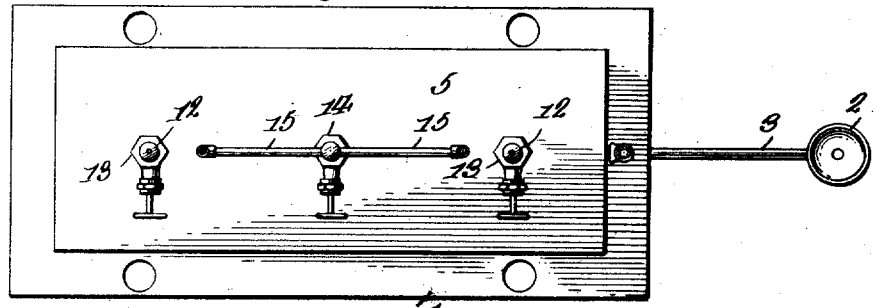
Fig. 2 is a horizontal section taken substantially on the line 2—2 of Fig. 1.

By referring now more particularly to Figs. 1 and 4 of the drawings it will be seen that I provide a generating pan 1 which may either be rectangular in configuration as shown in Fig. 1 or circular as shown in Fig. 4. The generating cup 2 communicates with the pan 1 by a connecting pipe 3.

Disposed in the generating pan 1 and resting on legs 4 is a vaporizing chamber 5. Liquid fuel is delivered to the vaporizing chamber 5 from a tank 6 through piping 7 in which a valve 8 is interposed so that the fuel supply may be cut off at will.

The pan 1 has overhanging flanges 22 extending inwardly from its walls and bearing upon the chamber 5 for holding the same in a set position.

Figure 3:
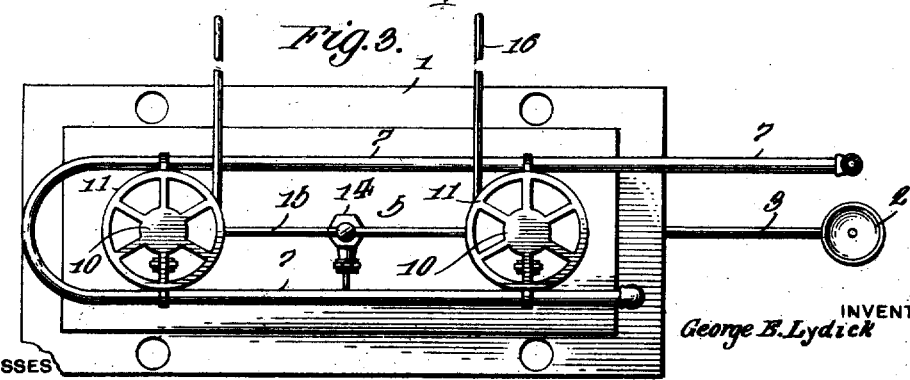
Fig. 3 is a plan view of the parts shown in Fig. 1.

It will be observed that in the form shown in Fig. 3, a piping 7 is bent in such a manner as to form a substantial leg U-shaped portion which extends over the vaporizer 5 in order that it may lie in the zone of greatest heat rising from the vaporizer 5 and the generator pan 1 thereby preheating the fuel before it enters the vaporizer 5.

In the construction shown in Figs. 4 and 5 the pipe 7 leading from the fuel tank 6 joins with a spiral coil 9, which in turn connects with the vaporizer 5. In either construction the ultimate result of thoroughly vaporizing the fuel is the same with the possible exception that with the construction shown in Fig. 5 the liquid fuel will be vaporized more readily by reason of the provision of the greater heating surface before it enters the vaporizer 5.

Spreaders including the central portions 10 and the rim portions 11 are mounted between the legs of the U-shaped portion of the pipe 7 in Fig. 3. Vaporized fuel from the vaporizer 5 is ejected through openings 12 in the valved ejectors 13. The vaporized fuel striking the central plates 10 of the spreaders, spreads outwardly toward the rim portions 11 thus enlarging the heat zone of each burner. A central valved ejector 14 carries lateral branches 15 which connect with rearwardly extending pipe portions 16 leading to the space above the oven of the stove.

In the construction shown in Figs. 4 and 5 a valved ejector 17 is provided having a plurality of radial branches 18 having suitable discharge tips 19. The tips 19 discharge the vaporized fuel from the vaporizer 5 against spreaders 20 supported between adjacent sections of the spiral pipes 9 as shown in Fig. 5. The valved ejector 17 is operable from the outside of the stove through the medium of a connecting wire 21.

Having thus described the construction of the device, the operation thereof and the manner of its application is as follows. As previously stated the liquid fuel burner is adapted more particularly for use in cooking stoves, however with suitable modifications whereby the various parts will be made considerably larger, the device may be adapted to stationary and locomotive boilers, and in fact to any other uses where liquid fuel may readily be consumed.

In setting the burner in operation, a quantity of liquid fuel is poured into the generating cup 2 which thereupon flows through the pipe 3 into the generating pan 1, where it is ignited and the vaporizing chamber 5 consequently heated. The liquid fuel in the vaporizing chamber 5 will be converted into a vapor by reason of the application of heat thereto, and upon opening the valved ejectors 13 vaporized fuel will flow through the openings 12 against the spreader plates 10. This vaporized fuel will in turn be ignited and will burn with a dark-blue and very hot flame.

The central spreader plates 10 will cause the flames to spread outwardly toward the rims 11 and as previously explained will extend the heat zone. Should it be desired to direct the vaporized fuel backwardly over the oven of the stove, the valved ejector 14 may be opened and the vaporized fuel directed rearwardly for the purpose described.

In conclusion I wish to point out that one of the important features obtained from my device is that no foreign particles can raise with the vapor from the oil to choke up the opening on the valved members of the vaporizer 5. It will be readily understood that such carbon as may happen to be in the oil will stay on the bottom of the vaporizing chamber. The vapor mixing in the air before striking the spreader plates, burns a fresh amount of air and makes perfect combustion. It will thus be seen that stopped up burners, and carbonized pipes are thus avoided and the full heating benefit of the burning fuel is gotten.

While the construction and arrangement of the device is that of a generally preferred form, obviously various modifications therein may be made without departing from the spirit of the invention or the scope of the claims.

I claim:

1. A liquid fuel burner including a circular generating pan, a priming cup connected with the pan, a vaporizing chamber disposed in the generating pan, a liquid fuel reservoir, a spiral coil disposed over the generating pan connected at one end with the fuel reservoir and at the other end with the vaporizing chamber, a valved ejector connected with the vaporizing chamber, a plurality of radial branches connected with the ejector, connections on the branches having openings, and spreader plates supported by the spiral coil over the connections to receive and spread the ejected vaporized fuel.

2. In a liquid fuel burner, the combination of a comparatively flat generating pan, a comparatively flat vaporizing chamber, extending into said generating pan, means for supporting said chamber above the bottom of said pan, means for holding said chamber against side movement, a pipe extending above said generating pan and connected to said vaporizing chamber, a valved ejector connected to said vaporizing chamber and positioned below said pipe, and spreader plates supported by said pipe.

3. In a liquid fuel burner, the combination of a generating pan, said generating pan having overhanging inwardly extending flanges formed thereon, a vaporizing chamber projecting into said generating pan, said flanges engaging said vaporizing chamber for holding the same against side movement, supporting legs interposed between said chamber and generating pan for holding the said vaporizing chamber above the bottom of said pan, a pipe supported above said vaporizing chamber, means for supplying said pipe with a liquid fuel, said pipe communicating with said vaporizing chamber, a valved ejector carried by said vaporizing chamber, and a spreader plate, carried by said pipe above said ejector for receiving and spreading the ejector vaporized fuel.

4. In a liquid fuel burner, the combination of a generating pan, having inwardly extending flanges, a priming cup connected to said pan, a vaporizing chamber extending into said pan, supporting legs interposed between said pan and said vaporizing chamber for supporting said chamber above said pan, said flanges engaging said chamber for holding the same against side movement, a liquid fuel reservoir, a spiral coil disposed over the chamber and connected at one end to said fuel reservoir and at the opposite end to said chamber, a valved ejector connected to said chamber, a plurality of branches connected with said ejector, connections on said branches having openings, and spreader plates supported by said spiral coil over said connections.

5. In a liquid fuel burner, the combination of a generating pan, having a priming cup connected with the pan, a vaporizing chamber disposed in the generating pan, a liquid fuel reservoir, a pipe disposed over the generating pan and connected at one end with the fuel reservoir and at the other end with the vaporizing chamber, a valved ejector connected with the vaporizing chamber, a plurality of branches connected with the ejector, connections of the branches having openings, and spreader plates supported by the pipe over the connections to receive and spread the vaporized fuel.

In testimony whereof I affix my signature in presence of two witnesses.

GEORGE E. LYDICK.

Witnesses:
Geo. Halley,
A. J. Seim.